United States Patent
Chang

(10) Patent No.: US 12,554,114 B2
(45) Date of Patent: Feb. 17, 2026

(54) AUTOMATICALLY DETECTING SYSTEM WITH MICROSCOPE AND METHOD THEREOF

(71) Applicants: Inventec Easy Doctor Corporation, Shanghai (CN); Inventec Appliances (Shanghai) Co. Ltd., Shanghai (CN); Inventec Appliances (Pudong) Corporation, Shanghai (CN); Inventec Appliances Corporation, New Taipei (TW)

(72) Inventor: Yen-Chieh Chang, New Taipei (TW)

(73) Assignees: Inventec Easy Doctor Corporation, Shanghai (CN); Invectec Appliances (Shanghai) Co. Ltd., Shanghai (CN); Inventec Appliances (Pudong) Corporation, Shanghai (CN); Invectec Appliances Corporation, New Taipei (TW)

( * ) Notice: Subject to any disclaimer, the term of this patent is extended or adjusted under 35 U.S.C. 154(b) by 656 days.

(21) Appl. No.: 18/152,426

(22) Filed: Jan. 10, 2023

(65) Prior Publication Data
US 2023/0341673 A1    Oct. 26, 2023

(30) Foreign Application Priority Data
Apr. 22, 2022    (CN) .......................... 202210428076.9

(51) Int. Cl.
G02B 21/36     (2006.01)
G01N 21/01     (2006.01)
(Continued)

(52) U.S. Cl.
CPC ........... *G02B 21/365* (2013.01); *G01N 21/01* (2013.01); *G01N 33/491* (2013.01);
(Continued)

(58) Field of Classification Search
CPC .... G01N 21/01; G01N 33/491; G02B 21/241; G02B 21/244; G02B 21/26; G02B 21/34;
(Continued)

(56) References Cited

U.S. PATENT DOCUMENTS

2014/0178169 A1    6/2014    Hebert et al.
2019/0257846 A1    8/2019    Reinhardt et al.

FOREIGN PATENT DOCUMENTS

CN    104870971 A    8/2015
CN    108026500 A    5/2018
(Continued)

*Primary Examiner* — Jennifer Wecker

(57) ABSTRACT

An automatically detecting system with microscope includes a platform and a gripper. The platform has a carrying area, a fixed block, a movable block, and an elastic member. The carrying area is formed at the platform, the fixed block and the movable block are configured at opposite sides of the carrying area, and the elastic member is connected to the movable block. The gripper pushes the movable block through an inclined plane of the movable block when moving a slide to the carrying area. When the gripper puts the slide on the carrying area, the movable block and the fixed block hold the slide with the elastic restoring force of the elastic member, and the gripper closes and moves on the upper surface of the slide to flatten the slide. Therefore, the slide can be set on the platform stably and flatly to obtain the focal length precisely and rapidly.

12 Claims, 7 Drawing Sheets

(51) Int. Cl.
  *G01N 33/49* (2006.01)
  *G02B 21/24* (2006.01)
  *G02B 21/34* (2006.01)

(52) U.S. Cl.
  CPC ......... *G02B 21/241* (2013.01); *G02B 21/244* (2013.01); *G02B 21/34* (2013.01); *G02B 21/361* (2013.01); *G02B 21/362* (2013.01)

(58) Field of Classification Search
  CPC ... G02B 21/361; G02B 21/362; G02B 21/365
  See application file for complete search history.

(56) References Cited

FOREIGN PATENT DOCUMENTS

| | | |
|---|---|---|
| CN | 110133309 A | 8/2019 |
| CN | 112557392 A | 3/2021 |
| CN | 113316724 A | 8/2021 |
| JP | 6457125 B2 | 1/2019 |
| TW | I711814 B | 12/2020 |

AUTOMATICALLY DETECTING SYSTEM WITH MICROSCOPE AND METHOD THEREOF

BACKGROUND OF THE INVENTION

1. Field of the Invention

The present invention relates to an automatically detecting system with microscope and the method thereof, and more particularly, to an automatically detecting system with microscope and the method thereof to dispose the slide into the microscope platform flatly and to quickly and accurately obtain the correct focal length of the microscope.

2. Description of the Prior Art

Cancer has become one of the important causes of death in developed countries, and the main reason why the cancer is so deadly is cancer cell metastasis. The cancer cell metastasis is closely related to circulating tumor cells (CTCs) in the blood. In detail, the cancer cell metastasis mainly has the following stages: tumor cells detach from the original tumor organ tissue and pass through the capillaries to reach the blood vessels; the tumor cells that have entered the blood vessels circulate with the blood to various parts of the body, and the tumor cells at this time are also called circulating tumor cells (CTCs); and when CTCs reach another organ, CTCs would penetrate the vessel wall of the blood vessels and enter the tissue of the organ to form new tumors in this organ. Therefore, the inadequacy of traditional cancer detection can be overcome by monitoring the number of CTCs in the blood to make the cancer monitoring of patients more comprehensive.

In CTC detection, CTCs are separated from the subject's blood sample to obtain a liquid containing the CTCs first, and then the liquid is injected into a slide and observed by a microscope. Since the tumor cells are larger in size and have special antigens on their cell membranes, they can be confirmed on the captured images after staining and the quantity can be counted, thereby inferring the number of CTCs in the patient's blood and the degree of cancer cell metastasis.

In the prior art, CTC detection has been automated, and the above-mentioned steps can be all achieved by an automatic detection system. When the liquid containing CTCs is injected into the slide, the automatic detection system can move the slide to the microscope by the mechanical gripper. However, each time the gripper moves the slide into the microscope, different focal length for capturing the image of the slide occurs for the following reasons: 1. the mechanical action of gripping the slide causes the slide not flat in the microscope; 2. the manufacturing tolerances of the slides cause different focal lengths for each of the slides; and 3. the curvature of the slide cause different focal lengths on different positions of the same slide. The different distances may cause the liquid containing CTCs in the slide out of the focal length of the microscope to generate the blurred image, and then the subsequent calculation of the number of CTCs from the blurred image would be inaccurate. The inaccurate number calculation of CTCs is quite unfavorable for the disease monitoring because the cancer cells may have metastasized but not found.

Therefore, how to put the slide into the microscope platform stably and flatly so as to quickly and accurately obtain the correct focal length to make the captured image clear for subsequent analysis is a technical problem to be solved urgently by those skilled in the art.

SUMMARY OF THE INVENTION

In order to overcome the above-mentioned defects of the prior art, one category of the present invention is to provide an automatically detecting system with microscope for putting the slide into the microscope platform stably and flatly so as to quickly and accurately obtain the correct focal length to make the captured image clear for subsequent analysis.

In one embodiment of the present invention, the automatically detecting system with microscope configured for capturing an image of the object in the slide includes a platform and a gripper. The platform includes a carrying area formed on the platform to carry the slide, a fixed block disposed on one side of the carrying area, a movable block disposed on the other side opposite to the side where the fixed block is configured of the carrying area and having an inclined plane, and an elastic member connected to the movable block and configured to push the movable block toward the carrying area. The gripper is configured to grip the slide and move the slide to the carrying area.

Wherein, the gripper pushes the movable block by contacting the inclined plane of the movable block when moving the slide to the carrying area. After putting the slide on the carrying area, the movable block and the fixed block hold the slide via the elastic restoring force of the elastic member, and the gripper closes and moves on the upper surface of the slide to flatten the slide.

In one embodiment, the automatically detecting system with microscope further includes a microscope configured at a position corresponding to the carrying area of the platform. The microscope is configured to capture the image of the object in the slide in the carrying area.

In one embodiment, a lens of the microscope is configured to move toward or away from the carrying area to make the object in the slide at the focal length of the microscope.

In one embodiment, the automatically detecting system with microscope further includes a blood separation device configured to separate a biological substance from blood and inject a liquid containing the biological substance into the slide. The gripper is configured to grip the slide containing the liquid and move the slide to the carrying area of the platform.

In one embodiment, the blood separation device is a CTC separation device, and the biological substance is CTC.

One category of the present invention is to provide an automatically detecting method with microscope for capturing the image of the object in the slide including the following steps of: a gripper gripping and moving the slide to a carrying area of a platform; after putting the slide on the carrying area of the platform, a movable block and a fixed block of the platform holding the slide via the elastic restoring force of an elastic member; and the gripper closing and moving on the upper surface of the slide to flatten the slide.

In one embodiment, the automatically detecting method with microscope further includes the following step of: a microscope capturing the image of the flattened slide in the carrying area.

In one embodiment, the automatically detecting method with microscope further includes the following step of: a lens of the microscope moving toward or away from the carrying area to make the object in the slide at the focal length of the microscope.

In one embodiment, the automatically detecting method with microscope further includes the following step of: the lens moving toward or away from the carrying area according to curve fitting method or inflection point searching algorithm to make the object in the slide at the focal length of the microscope.

In one embodiment, the automatically detecting method with microscope further includes the following step of: a controlling device processing the image captured by a microscope to compute whether the image comprising an unsuitable situation, and the controlling device fixing the unsuitable situation and controlling the microscope to recapture the image of the flattened slide in the carrying area when the image includes the unsuitable situation. Wherein, the unsuitable situation includes overexposed images, absence of any object in the images, significant difference between the preset focal length and the correct focal length, and the different objects presented on different planes in the same image.

In one embodiment, the overexposed image is determined by overexposed object occupying more than a certain percentage of the image; absence of any object in the image is determined by the sum of the pixels which is exceeding a preset background brightness being less than a predetermined number of pixels in the image; significant difference between the preset focal length and the correct focal length is determined by the blurred degree of the image being higher than a preset value; different objects presented on different planes in the same image is determined by the area and the brightness standard difference of uneven brightness area in the image being respectively greater than their thresholds.

In one embodiment, the automatically detecting method with microscope further includes the following step before the step of the gripper gripping and moving the slide: separating a biological substance from a blood sample and injecting a liquid containing the biological substance into the slide.

Compared with the prior art, the automatically detecting device and method with microscope of the present invention can put the slide which carries the object to be captured to the microscope platform stably and flatly, and then flatten the slide to reduce the variety of the focal length. Therefore, different focal length testing methods can be utilized to obtain the correct focal length quickly and accurately to make the captured image clear, thereby facilitating the subsequent analysis process for the captured image.

BRIEF DESCRIPTION OF THE APPENDED DRAWINGS

The features and advantages of the present invention will become more apparent by describing in detail example embodiments thereof with reference to the accompanying diagrams.

DETAILED DESCRIPTION OF THE INVENTION

The embodiments will be described more fully with reference to the following diagrams. However, the embodiments can be embodied in various forms and should not be construed as limited to the examples set forth herein. On the contrary, this present invention will be thorough and complete according to these embodiments, and will fully convey the concept of the embodiments to those skilled in the art. The described features, structures, or characteristics may be combined in any suitable manner in one or more embodiments. Furthermore, the diagrams are merely schematic illustrations of the present invention and are not necessarily drawn to scale. The same drawing numerals in the diagrams denote the same or similar parts, and thus their repeated descriptions will be omitted.

Figure 1:
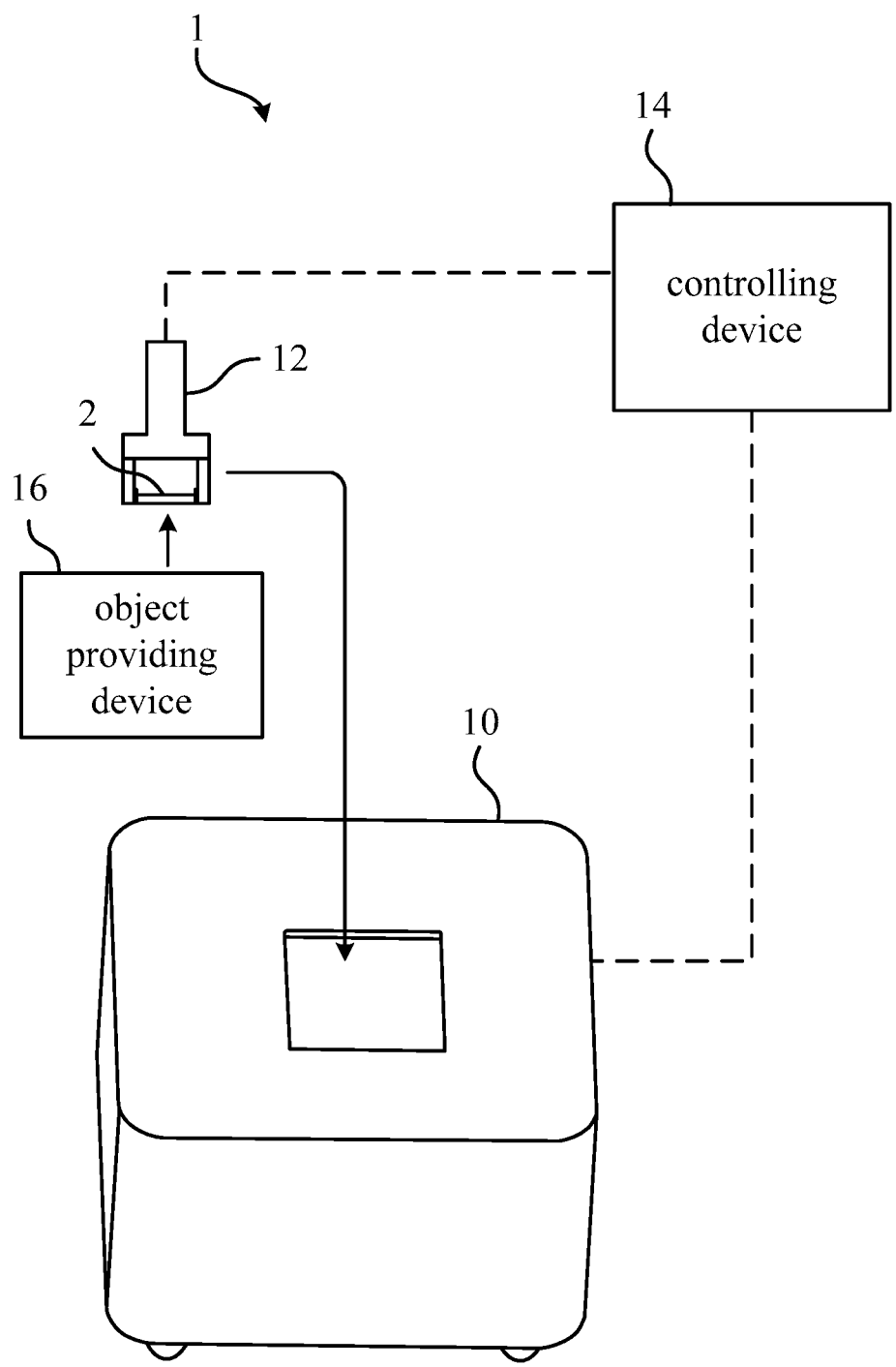
FIG. 1 is a schematic diagram illustrating an automatically detecting system with microscope according to an embodiment of the present invention.

Please refer to FIG. 1. FIG. 1 is a schematic diagram illustrating an automatically detecting system 1 with microscope according to an embodiment of the present invention. As shown in FIG. 1, the automatically detecting system 1 with microscope of the present invention includes a microscope device 10 and a gripper 12. Moreover, the automatically detecting system 1 with microscope further includes a controlling device 14 and an object providing device 16. The controlling device 14 can be connected to the microscope device 10 and a gripper 12 to control the gripper 12 to grip a slide 2 from the object providing device 16 and to move the slide 2 to the microscope device 10 for capturing image. In this embodiment, the object providing device 16 can be a CTC separation device for separating CTCs from the blood sample and injecting a liquid containing CTCs into the slide for the gripper 12 to grip. In practice, the object providing device 16 can include, but are not limited to, a blood separation device and a CTC separation device. In other words, any device for providing a liquid containing biological substances can be the above-mentioned object providing device, and the object providing device can also be another device other than the automatically detecting system with microscope. The automatically detecting system with microscope is configured to detect the test piece provided by the object providing device. Furthermore, in practice, the biological substances can include, but are not limited to CTCs. The objects that can be captured by the microscope, such as cells, proteins, etc., all belong to the scope of the present invention. In addition, in practice, the slides of the present invention include, but are not limited to, sheet-like containers, glass slides, and the like to carry liquid samples.

Figure 2:
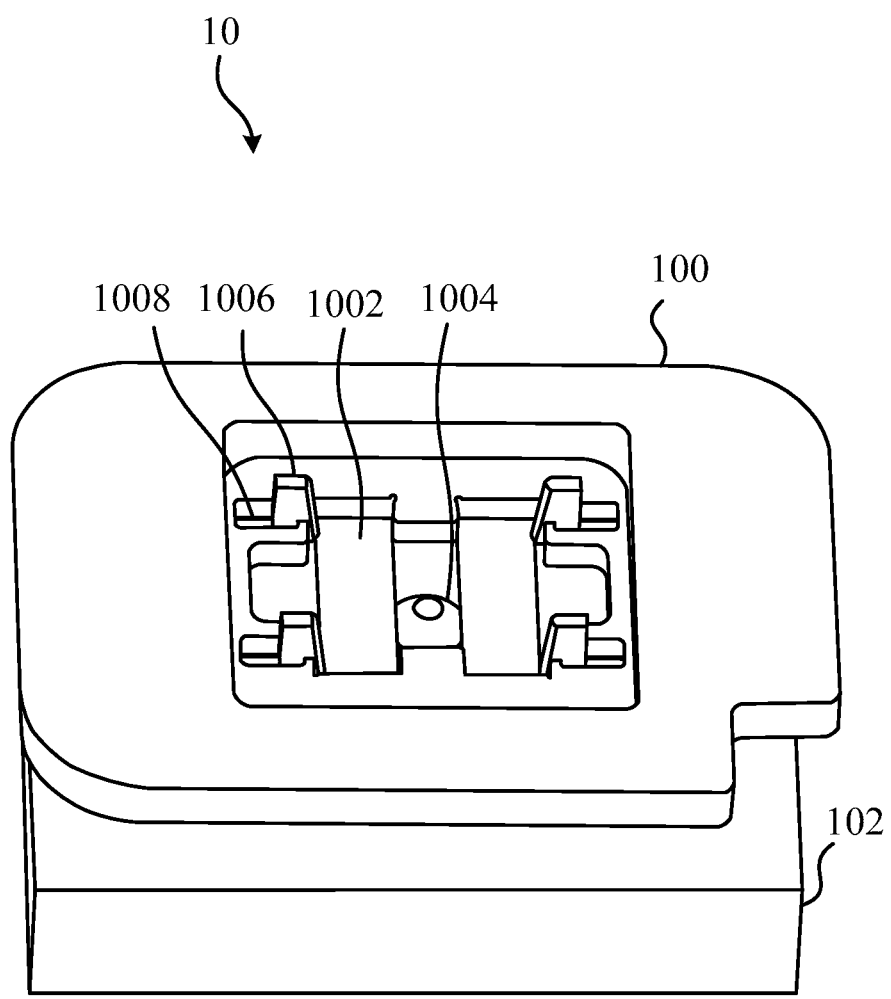
FIG. 2 is a schematic diagram illustrating the internal structure of a microscope device of the automatically detecting system with microscope in FIG. 1.
Figure 3A:
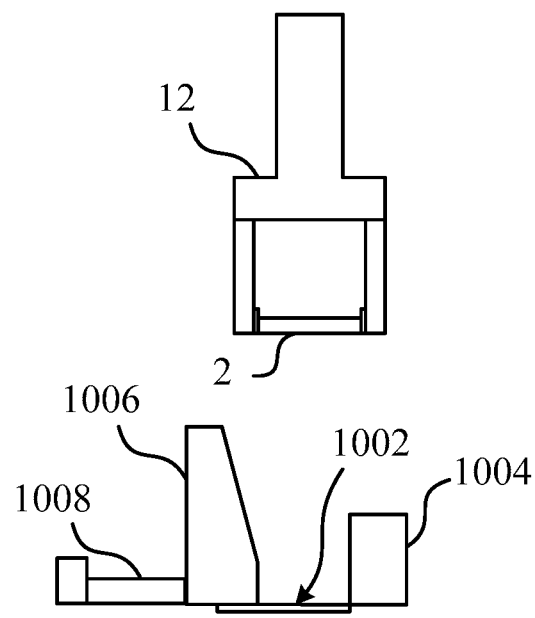
FIG. 3A to FIG. 3E are schematic diagrams illustrating the gripper in FIG. 1 putting the slide into the platform of the microscope device.
Figure 3B:
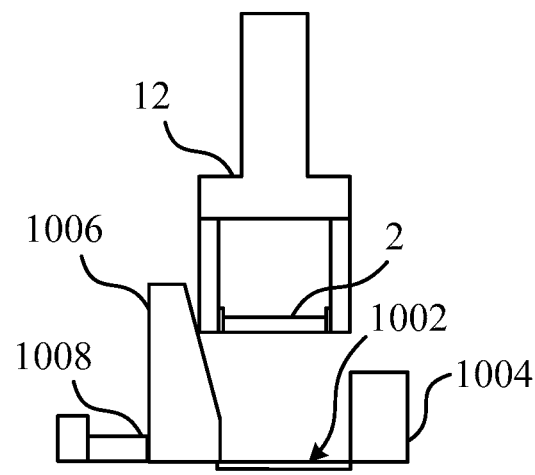
Figure 3C:
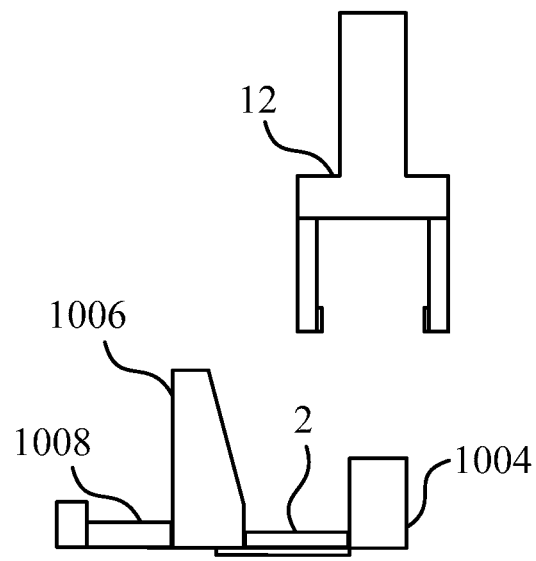
Figure 3D:
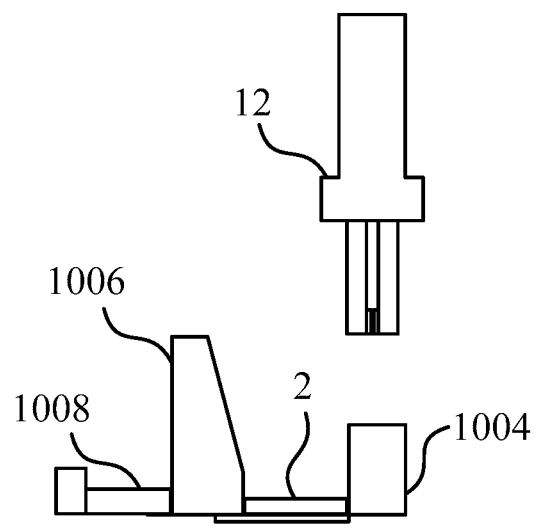
Figure 3E:
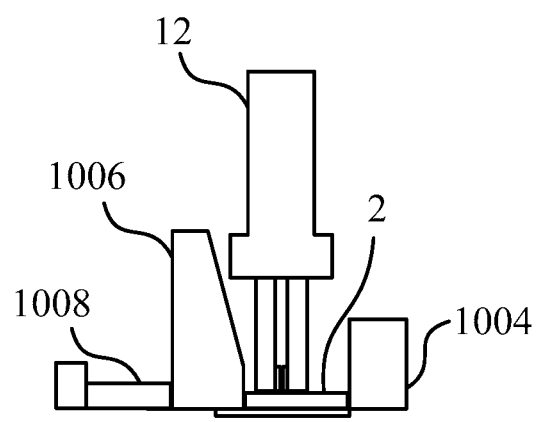

After controlling the gripper 12 to grip the slide, the controlling device 14 can control the gripper 12 to move the slide onto the platform of the microscope device 10 for capturing the image. Please refer to FIG. 2. FIG. 2 is a schematic diagram illustrating the internal structure of a microscope device 10 of the automatically detecting system 1 with microscope in FIG. 1. It should be noted that the housing of the microscope device 10 in FIG. 2 is omitted. As shown in FIG. 2, the microscope device 10 further includes a platform 100 and a microscope 102, and the platform 100 further includes a carrying area 1002, a fixed block 1004, a movable block 1006 and an elastic member 1008. The fixed block 1004 is fixed on one side of the carrying area 1002. Correspondingly, the movable block 1006 is disposed on the other side of the carrying area 1002 and opposite to the fixed block 1004. The elastic member 1008 is connected to the movable block 1006 and the main body of the platform 100 to provide an elastic force to push the movable block 1006 toward the carrying area 1002. The microscope 102 is disposed below the platform 100, and the microscope 102 includes a lens corresponding to the position of the carrying area 1002. Therefore, the microscope 102 can capture the image of the objects located in the carrying area 1002. As shown in FIG. 2, the platform 100 of the embodiment includes two carrying areas 1002, and each of the carrying areas 1002 cooperates with two movable blocks 1004. In practice, the number of the carrying area and the movable block are not limited to those in FIG. 2, and it can be determined according to the requirement of the user or designer.

Please refer from FIG. 3A to FIG. 3E. FIG. 3A to FIG. 3E are schematic diagrams illustrating the gripper 12 in FIG. 1 putting the slide 2 into the platform 100 of the microscope device 10. In order to simplify the figures, FIG. 3A to FIG. 3E only illustrates the carrying area 1002, the fixed block 1004, the movable block 1006 and elastic member 1008 of the platform 100, and the other components are omitted. As shown in FIG. 3A to FIG. 3E, the gripper 12 moves to the position above the carrying area 1002 after gripping the slide 2, and then moves downward to contact the inclined plane of the movable block 1006. The gripper 12 continues to moves downward and can apply a force on the movable block 1006 through the inclined plane of the movable block 1006, so that the movable block 1006 moves in a direction away from the carrying area 1002 and the elastic member 1008 is compressed by the movable block 1006 simultaneously. The gripper 12 releases the slide 2 in the carrying area 1002 and leaves the carrying area 1002, and the movable block 1006 is pushed by the elastic restoring force of the elastic member 1008 at this time to hold the slide 2 in the carrying area 1002 with the fixed block 1004. Moreover, the gripper 12 can close after releasing the slide 2, and move downward to contact and then move on the upper surface of the slide 2 to flatten it. Therefore, the slide 2 can be stably disposed in the carrying area 1002 of the platform 100, and the flattening action of the gripper 12 on the slide 2 can greatly reduce the aforementioned influence on the focal lengths due to the mechanical action or the difference between the slides.

The above-mentioned designs of the gripper and the platform can reduce the problem of different focal lengths each time the gripper moves the slide into the microscope. However, the manufacturing tolerance and curvature are the characteristics affecting the focal length of the slide itself. In the prior art, in order to reduce the influence of the characteristics of the slide on the focal length, the quality control of the slides must be improved. However, the disadvantage of this method is time-consuming and high costs. The automatically detecting system 1 with microscope of the present invention processes the focal length test to obtain the correct focal length after the gripper 12 flattens the slide 2. Therefore, the slide 2 can be located at the focal length to capture the clear image for subsequent analysis, to omit the quality control of the slide to save time and costs.

As shown in FIG. 2, the microscope 102 is disposed below the platform 100, and the microscope 102 includes a lens corresponding to the position of the carrying area 1002. The distance between the lens of microscope 102 and the carrying area 1002 can be changed to adjust the location of the focal length. It should be noted that although the microscope 102 adjusts the focal length by adjusting the distance in this embodiment, any means for changing the focal length of the microscope could be used in the present invention besides the distance in practice. After the slide 2 is disposed in the carrying area 1002 and flattened by the gripper 12, the microscope 102 can adjust the distance between the lens and the carrying area 1002, i.e., adjust the locations of the focal length of the lens of the microscope 102, according to two different algorithms to find the correct focal length for the slide 2 located in the carrying area 1002 currently. In practice, the average value of the focal length data of a plurality of slides can be collected to determine a predetermined focal length value to narrow a range for testing focal length before the above step of adjusting focal length. However, the focal length for the slide 2 in the carrying area 1002 of the platform 100 may be in or out of the range for testing focal length determined in the above-mentioned steps, and the focal length test will be performed through different algorithms in these two situations.

As shown in FIG. 1, the automatically detecting system 1 with microscope further includes a controlling device 14 connected to the gripper 12 and the microscope device 10, and the controlling device 14 is configured to control the microscope device 10 to process focal length adjustment and test. Furthermore, the controlling device 14 can include a computing unit for computing and confirming the correct focal length according to the image captured by the microscope device 10. In practice, the controlling device 14 can be any device capable of issuing instructions and perform calculations, such as a computer system or a control chip. The controlling device 14 finds the correct focal length corresponding to the slide 2 according to curve fitting method when determining that the image of the slide 2 captured by the microscope device 10 is not in the range for testing focal length. The curve fitting method is based on the physical phenomenon that the relation of the clarity of optical imagery and the object distance (distance between lens and slide 2) is presented as normal distribution. In detail, the controlling device 14 can adjust the distances between the lens and the slide 2 to obtain three or more clarity data, process the above-mentioned clarity data and the corresponding object distance to obtain a curve equation, and then differentiate the curve equation to obtain the vertex of the curve represented by the curve equation. The object distance corresponding to the vertex is correct focal length.

Moreover, the controlling device 14 can also find the correct focal length of the slide 2 according to inflection point searching algorithm when determining that the image of the slide 2 captured by the microscope device 10 is in the range for testing focal length. In detail, the controlling device 14 can firstly adjust the slide 2 at any location in the range and capture the image of the slide 2 to obtain the clarity of the image. The controlling device 14 can adjust the location of the slide 2 by reducing the distance of the slide 2 to the lens for one focal length unit and capture the image again. If the clarity of the captured image obtained by the second capturing is better than that of the first capturing, it means that the focal length of the first capturing is greater than the correct focal length. Therefore, it is necessary to reduce the focal length unit and capturing the image again to compare the clarity of the present image with that of the previous image. Once the newest clarity obtained by continuously reducing the focal length unit reverses to be worse than the last clarity of the previous capturing, the focal length of the previous capturing is the correct focal length.

Contrarily, if the clarity of the image obtained by the second capturing is worse than that of the first capturing, it means that the focal length of the first capturing is the correct focal length or smaller than the correct focal length.

Therefore, it is necessary to adjust the location of the slide 2 by increase one focal length unit from the first location for testing. Furthermore, when the clarity of the image obtained by the third capturing is worse than that of the first capturing, it would be known that the focal length of the first focusing is the correct focal length. If the clarity of the image obtained by the third capturing is better than that of the first capturing, it means that the focal length of the first capturing is smaller than the correct focal length. It is necessary to increase one focal length unit again for testing. Once the newest clarity obtained by continuously increasing the focal length unit reverses to be worse than the last clarity of the previous capturing, the focal length of the previous capturing is the correct focal length.

The steps of the inflection point searching algorithm described above can form loops. However, if the reversal point cannot be found even after many cycles or many loops, the last focal length can be regarded as the correct focal length. In practice, the focal length unit can be determined according to the requirements of the user or designer.

In summary, the automatically detecting system with microscope of the present invention can put the slide into the microscope platform and flatten the slide by the gripper, and then find the correct focal length through the focal length testing algorithm. Therefore, the system can effectively solve the problems of unclear captured images and inaccurate subsequent analysis caused by the slide not flat in the microscope, the manufacturing tolerance of the slide, and the different focal lengths due to the curvature of the slide.

Figure 4:
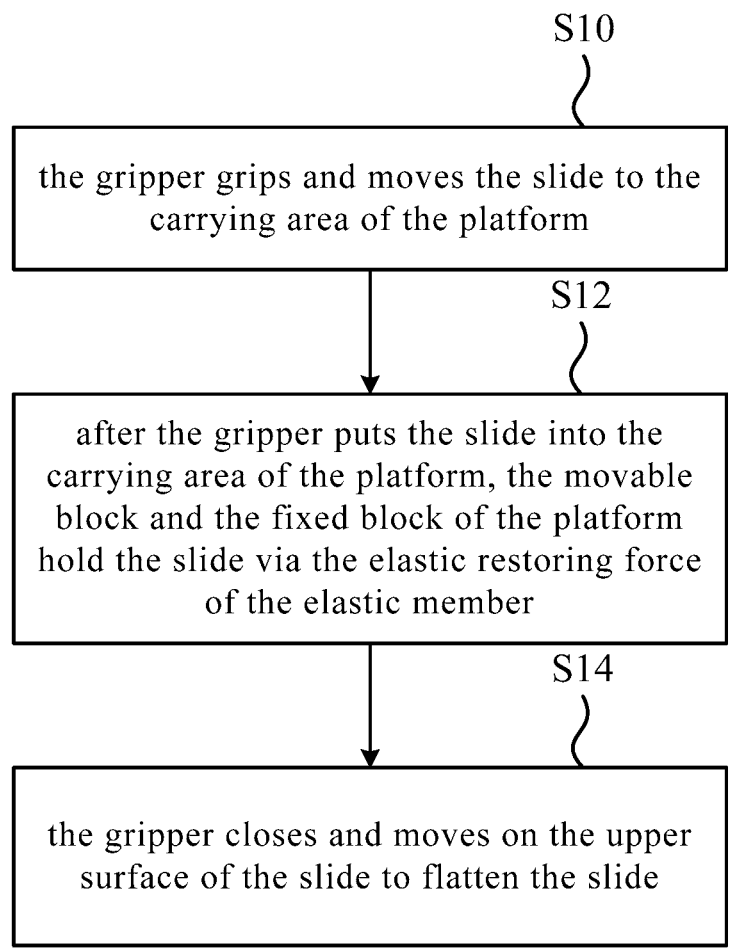
FIG. 4 is a flow diagram illustrating an automatically detecting method with microscope according to an embodiment of the present invention.

In addition to the aforementioned automatically detecting system with microscope, the present invention further provides an automatically detecting method with microscope which can be executed by the automatically detecting system 1 with microscope. Please refer to FIG. 4. FIG. 4 is a flow diagram illustrating an automatically detecting method with microscope according to an embodiment of the present invention. Since the embodiment of FIG. 4 can be achieved by the system of the previous embodiment, the steps of the automatically detecting method with microscope will be directly described with each component in the automatically detecting system 1 with microscope. The detailed structure and function of each component of the automatically detecting system 1 with microscope can be referred to the previous figures and descriptions of the specific embodiments, and will not be repeated here.

As shown in FIG. 4, the automatically detecting method with microscope includes the following steps. Step S10: the gripper 12 grips and moves the slide 2 to the carrying area 1002 of the platform 100. Step S12: after the gripper 12 puts the slide 2 into the carrying area 1002 of the platform 100, the movable block 1006 and the fixed block 1004 of the platform 100 hold the slide 2 via the elastic restoring force of the elastic member 1008. Step S14: the gripper 12 closes and moves on the upper surface of the slide 2 to flatten the slide 2. Therefore, the automatically detecting method with microscope of this embodiment can reduce the problem of unclear captured images caused by the slide not flat in the microscope due to the mechanical action of gripping the slide.

Figure 5:
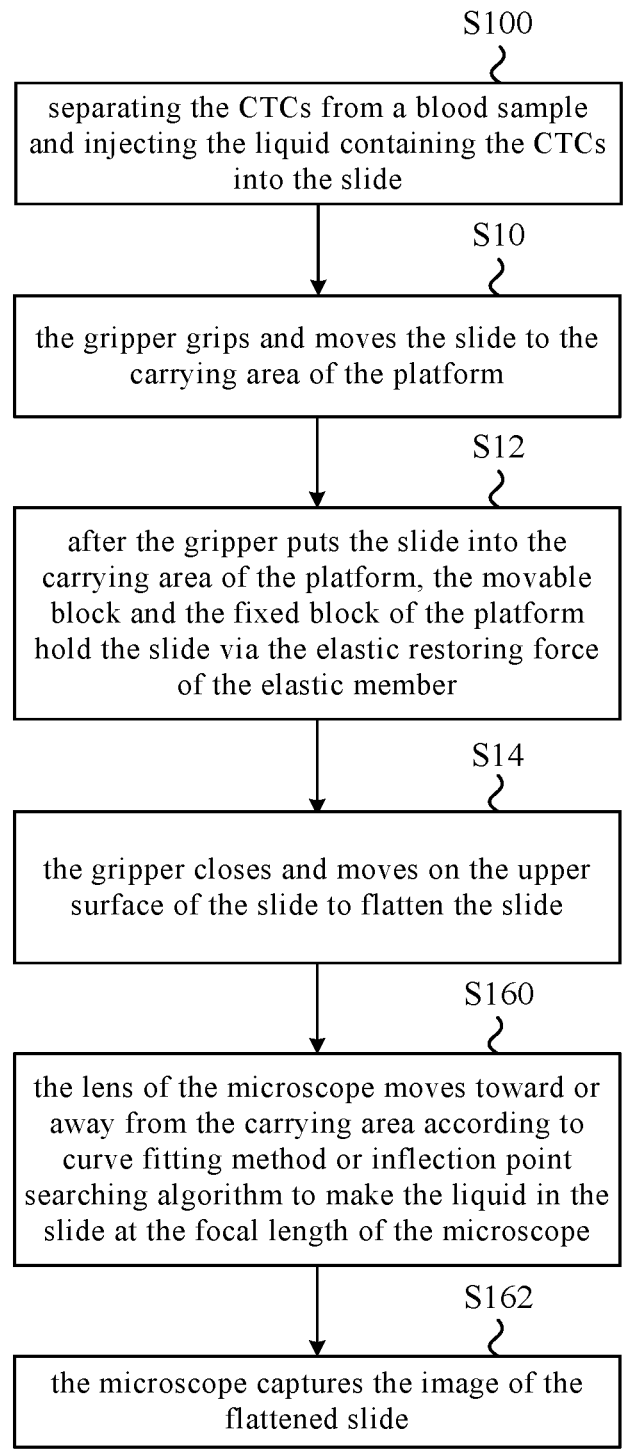
FIG. 5 is a flow diagram illustrating an automatically detecting method with microscope according to another embodiment of the present invention.

The automatically detecting method with microscope of the present invention can be applied to an automatically CTC detection for clarifying the image of the liquid containing CTCs to count number of CTCs. Please refer to FIG. 5. FIG. 5 is a flow diagram illustrating an automatically detecting method with microscope according to another embodiment of the present invention. As shown in FIG. 5, in addition to the steps of the FIG. 4, the automatically detecting method with microscope further includes the following steps. Step S100: separating the CTCs from a blood sample and injecting the liquid containing the CTCs into the slide 2. Step S160: the lens of the microscope 102 moves toward or away from the carrying area 1002 according to curve fitting method or inflection point searching algorithm to make the liquid in the slide 2 at the focal length of the microscope 102. Step S162: the microscope 102 captures the image of the flattened slide 2. It should be noted that although the automatically detecting method with microscope in this embodiment is used for CTC detection, it is not limited to this application in practice. Any object carried by the slide can be stably put into the microscope through the above steps and calculated the correct focal length to obtain for high-clarity of capturing images.

In the step of S100, the object providing device 16 of the aforementioned embodiment can separate CTCs from the blood sample and inject the liquid containing the CTCs into the slide 2. After executing the step of S14, the slide 2 and the liquid in the slide 2 are flatly disposed in the carrying area 1002 of the platform 100 already, so that the problem of the mechanical action of gripping and moving the slide 2 resulting in uneven placement of the slide into the microscope has been overcome. However, the different focal lengths still can be affected by the manufacturing tolerance and the curvature of the slide. Therefore, the method of this embodiment can execute the step of S160 after executing the step of S14, that is to find the correct focal length of the slide 2 according to the curve fitting method or inflection point searching algorithm. In practice, the range for testing focal length can be determined by collecting the focal length data of plurality of slides first, and the curve fitting method or inflection point searching algorithm used for the test can be determined according to whether the focal length of the slide 2 is in the above-mentioned range for testing focal length. The detailed steps of the focal length test have been described in detail in the previous embodiments, so they will not be repeated here. After executing the step of S160, the liquid in the slide 2 can be located at the focal length of the microscope 102, and then executing the step of S162 to capture the image of the slide 2 and the liquid in the slide 2 by the microscope 102. At this time, the image of the liquid in the slide 2 captured by the microscope 102 is clear, so that the subsequent calculation of the number of CTCs based on the captured images will be quite accurate.

In the above-mentioned embodiment, the method of finding the focal length by the curve fitting method or inflection point searching algorithm is based on the images generated by the microscope capturing the slides at different distances for many times. However, in practice, if the captured image is an unqualified image, such as no object is captured in the image, this image for the focal length test will only get wrong result. Therefore, the automatically detecting method with microscope of the present invention can judge if the image includes unsuitable situations and determine whether the image should be recaptured to process the focal length test or not.

In one embodiment, the aforementioned automatically detecting method with microscope can further include the following steps of: the controlling device 14 processing the image captured by the microscope device 10 to compute whether the image includes unsuitable situations; and, the controlling device 14 fixing the unsuitable situation and controlling the microscope 102 to recapture the image of the flattened slide to obtain new image when the image includes the unsuitable situations.

The above steps can be executed after any step of the microscope device 10 capturing images to ensure that the obtained images are all qualified images and can be used for the focusing procedure. In practice, the image may include the following unsuitable situations causing the image to be out of focus: overexposed image, absence of any object in the image, significant difference between the preset focal length and the correct focal length, and different objects presented on different planes in the same image. The controlling device 14 can adjust the control parameters of the microscope device 10 according to the above-mentioned unsuitable situations and control the microscope 102 to recapture the image of the flattened slide to obtain the new image. For example, if the image is overexposed, the controlling device 14 can adjust the exposing conditions of the microscope device 10 to recapture the image. For the unsuitable situations of absence of any object in the image or the objects appearing in different planes of the image caused by the dust staining the surface of the slide (the dust and the object to be captured are located on different planes in the slide), the controlling device 14 can control the microscope device 10 to move to another field of view to capture image, so as to find the objects or avoid dust in the slide. Moreover, when the difference between the preset focal length and the correct focal length is significant, the captured image would be very blurry and the controlling device 14 can control the microscope device 10 to ascend or descend by a certain amount of movement to capture the image again.

The controlling device 14 can detect whether the image includes above-mentioned unsuitable conditions by the image processing. For example, the controlling device 14 calculates the brightness values of all objects in the image through image processing. When the overexposed objects occupies more than a certain proportion of the image, or the pixel area of the overexposed state exceeds 10% of the pixel area of all objects, the controlling device 14 determines that the image includes the unsuitable situation of overexposure. The above-mentioned certain proportion can be defined as, but not limited to, 70% of the objects, and the overexposure state can be defined as, but not limited to, the brightness value exceeding 250. In practice, these definitions are dependent on the requirements of the user or designer.

Moreover, if the sum of the pixels with brightness exceeding a preset background brightness calculated by the controlling device 14 via the image processing is less than a predetermined number of pixels in the image, the controlling device 14 determines that the image includes the unsuitable situation of absence of any object in the image. The objects in the image usually have higher brightness than the background, so the pixels in the image that exceed the set background brightness can be regarded as the pixels representing the objects in the image. The above-mentioned preset background brightness and the predetermined number of the pixels can be determined according to the practical situation but not limited in the present invention.

Furthermore, if the blurred degree of the image calculated by the controlling device 14 via the image processing is higher than a preset value or the clarity degree of the image is lower than the preset value, the controlling device 14 determines that the image includes the unsuitable situation of significant difference between the preset focal length and the correct focal length. Therefore, the controlling device 14 can control the microscope device 10 to ascend or descend by a certain amount of movement to capture the image again, and then find the correct focal length according to the image close to the correct focal length by curve fitting method or inflection point searching algorithm.

In addition, if the area and the brightness standard difference of uneven brightness area in the image calculated by the controlling device 14 via the image processing are respectively greater than their thresholds, the controlling device 14 determines that the image includes the unsuitable situation of different objects presented on different planes in the same image. In one embodiment, the object to be captured by the microscope device is located in the slide, but there may be dust or other objects staining the surface of the slide. The dust or other objects are located on the plane different from the plane where the object to be captured is located to interfere with focusing. The imaging characteristics of the dust on the slide surface are usually quite large in area and uneven in brightness. Therefore, the area and the brightness standard difference in the image being respectively greater than their thresholds can be the basis for judging whether the dust stains on the slide. The above-mentioned thresholds of area and brightness standard difference can be determined according to the practical situation but not limited in the present invention.

In summary, the automatically detecting method with microscope of the present invention can put the slide into the microscope platform and flatten the slide by the gripper, and then find the correct focal length through the different focal length testing algorithms. Therefore, the system can effectively solve the problems of unclear captured images and inaccurate subsequent analysis caused by the slide not flat in the microscope, the manufacturing tolerance of the slide, and the different focal lengths due to the curvature of the slide.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An automatically detecting system with microscope configured to capture an image of an object in a slide, the automatically detecting system with microscope comprising:

a platform, further comprising:
a carrying area, formed on the platform to carry the slide;
a carrying area, formed on the platform to carry the slide;
a fixed block, configured on one side of the carrying area;
a movable block, configured on the other side opposite to the side where the fixed block being configured of the carrying area, wherein the movable block has an inclined plane; and
an elastic member, connected to the movable block and configured to push the movable block toward the carrying area; and
a gripper, configured to grip the slide and move the slide to the carrying area; wherein, the gripper is configured to push the movable block by contacting the inclined plane of the movable block when moving the slide to the carrying area; after putting the slide on the carrying area, the movable block and the fixed block are configured to hold the slide in a position via the elastic restoring force of the elastic member, and the gripper is configured to close and move on the upper surface of the slide to flatten the slide.

2. The automatically detecting system with microscope of claim 1, further comprising a microscope configured at a position corresponding to the carrying area of the platform, wherein the microscope is configured to capture the image of the object in the slide in the carrying area.

3. The automatically detecting system with microscope of claim 2, wherein a lens of the microscope is configured to move toward or away from the carrying area to make the object in the slide at the focal length of the microscope.

4. The automatically detecting system with microscope of claim 1, further comprising a blood separation device configured to separate a biological substance from blood and inject a liquid containing the biological substance into the slide, wherein the gripper is configured to grip the slide comprising the liquid and move the slide to the carrying area of the platform.

5. The automatically detecting system with microscope of claim 4, wherein the blood separation device is a Circulating Tumor Cell (CTC) separation device, and the biological substance is CTC.

6. An automatically detecting method with microscope configured to capture an image of an object in a slide, the automatically detecting method with microscope comprising the following steps of:
    a gripper gripping and moving the slide to a carrying area of a platform; after putting the slide on the carrying area of the platform, a movable block and a fixed block of the platform to hold the slide in a position via the elastic restoring force of an elastic member; the gripper closing and moving on the upper surface of the slide to flatten the slide, and wherein the movable block comprises an inclined plane and the gripper pushes the movable block by contacting the inclined plane of the movable block when moving the slide to the carrying area of the platform.

7. The automatically detecting method with microscope of claim 6, further comprising the following step of:
    a microscope capturing the image of the flattened slide in the carrying area.

8. The automatically detecting method with microscope of claim 7, further comprising the following step of:
    a lens of the microscope moving toward or away from the carrying area to make the object in the slide at the focal length of the microscope.

9. The automatically detecting method with microscope of claim 8, further comprising the following step of:
    the lens moving toward or away from the carrying area according to curve fitting method or inflection point searching algorithm to make the object in the slide at the focal length of the microscope.

10. The automatically detecting method with microscope of claim 6, further comprising the following step of:
    a controlling device processing the image captured by a microscope to compute whether the image comprising an unsuitable situation, and the controlling device fixing the unsuitable situation and controlling the microscope to recapture the image of the flattened slide in the carrying area when the image comprises the unsuitable situation, wherein the unsuitable situation comprises overexposed image, absence of any object in the image, significant difference between the preset focal length and the correct focal length, and different objects presented on different planes in the same image.

11. The automatically detecting method with microscope of claim 10, wherein overexposed image is determined by the overexposed objects occupying more than a certain percentage of the image; wherein absence of any object in the image is determined by the sum of the pixels which is exceeding a preset background brightness being less than a predetermined number of pixels in the image; wherein significant difference between the preset focal length and the correct focal length is determined by the blurred degree of the image being higher than a preset value; wherein different objects presented on different planes in the same image is determined by the area and the brightness standard difference of uneven brightness area in the image being respectively greater than their thresholds.

12. The automatically detecting method with microscope of claim 6, further comprising the following step before the step of the gripper gripping and moving the slide:
    separating a biological substance from a blood sample and injecting a liquid containing the biological substance into the slide.

* * * * *